(12) United States Patent
Kumar et al.

(10) Patent No.: US 12,208,729 B2
(45) Date of Patent: Jan. 28, 2025

(54) CENTER HIGH-MOUNTED STOP LAMP SYSTEM

(71) Applicant: Rivian IP Holdings, LLC, Irvine, CA (US)

(72) Inventors: Priyank Kumar, Ypsilanti, MI (US); Luis Guillermo Sagastume, Fountain Valley, CA (US); Shammika Ashan Wickramasinghe, Banbury (GB); Simon Baker, Basingstoke (GB); Martin Neumann, Garden City, MI (US); Vinu Thaliath, Huntington Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/322,219

(22) Filed: May 23, 2023

(65) Prior Publication Data

US 2024/0391378 A1 Nov. 28, 2024

(51) Int. Cl.
| | |
|---|---|
| *B60Q 1/30* | (2006.01) |
| *B60Q 1/26* | (2006.01) |
| *F21S 9/02* | (2006.01) |
| *F21S 43/14* | (2018.01) |
| *H02J 7/00* | (2006.01) |
| *H05B 45/30* | (2020.01) |
| *F21Y 115/10* | (2016.01) |

(52) U.S. Cl.
CPC ............ *B60Q 1/302* (2013.01); *B60Q 1/2696* (2013.01); *F21S 9/02* (2013.01); *F21S 43/14* (2018.01); *H02J 7/0047* (2013.01); *H05B 45/30* (2020.01); *F21Y 2115/10* (2016.08)

(58) Field of Classification Search
CPC ....... B60Q 1/302; B60Q 1/2696; F21S 43/14; F21S 9/02; H05B 45/30; H02J 7/0047; F21Y 2115/10
See application file for complete search history.

(56) References Cited

U.S. PATENT DOCUMENTS

| | | | | |
|---|---|---|---|---|
| 4,931,697 A | * | 6/1990 | Nakajima | B60Q 1/44 315/80 |
| 2018/0220082 A1 | * | 8/2018 | Lewis | H04N 23/63 |
| 2020/0079281 A1 | * | 3/2020 | Singer | B60Q 1/2661 |
| 2021/0245662 A1 | * | 8/2021 | Blank | B60R 1/081 |

* cited by examiner

*Primary Examiner* — Omer S Khan
(74) *Attorney, Agent, or Firm* — Patterson + Sheridan, LLP (57) ABSTRACT

A center high-mounted stop lamp (CHMSL) system for a vehicle is provided. The CHMSL system includes a sensor, a primary CHMSL, a wireless secondary CHMSL, a vehicle wireless transceiver, and at least one processor coupled to the sensor, the primary CHMSL, and the vehicle wireless transceiver. The sensor is configured to generate sensor data, such as image data, proximity data, etc., associated with cargo loaded in a bed of the vehicle. The primary CHMSL includes a primary lamp. The wireless secondary CHMSL includes a secondary lamp, a battery, and control circuitry including a CHMSL wireless transceiver and a microcontroller. The processor is configured to facilitate, based on the sensor data, activation of the wireless secondary CHMSL. The processor is also configured to determine, based on the sensor data, whether the primary CHMSL is blocked or not blocked.

9 Claims, 11 Drawing Sheets

CENTER HIGH-MOUNTED STOP LAMP SYSTEM

INTRODUCTION

The present disclosure relates to vehicles. More particularly, the present disclosure relates to center high-mounted stop lamps (CHMSLs) for vehicles.

SUMMARY

Embodiments of the present disclosure advantageously provide a center high-mounted stop lamp (CHMSL) system for a vehicle. In many embodiments, the CHMSL system includes a sensor, a primary CHMSL, a wireless secondary CHMSL, a vehicle wireless transceiver, and at least one processor coupled to the sensor, the primary CHMSL, and the vehicle wireless transceiver. The sensor is configured to generate sensor data. The primary CHMSL includes a primary lamp. The wireless secondary CHMSL includes a secondary lamp, a battery, and control circuitry including a CHMSL wireless transceiver and a microcontroller. The processor is configured to facilitate, based on the sensor data, activation of the wireless secondary CHMSL.

DETAILED DESCRIPTION

This disclosure is generally directed to features for a center high-mounted stop lamp (CHMSL) system. Other terms for CHMSL include center brake lamp, high-level or eye-level brake lamp, cyclops brake light, safety brake lamp, etc. The purpose of the CHMSL is to safeguard a car or light truck from being struck in the rear by another vehicle. When the brakes are applied, the CHMSL sends a conspicuous, unambiguous message to drivers of following vehicles that they must slow down.

When the CHMSL is mounted at the top of the cab of a pickup truck, cargo that is loaded in or above the bed may obstruct the CHMSL, thereby eliminating the effect of this additional safeguard. Similarly, a cap or camper that is installed in the bed may also obstruct the CHMSL. When the CHMSL is mounted on the tailgate, the CHMSL will be facing the ground when the vehicle travels with the tailgate in the lowered position, thereby also eliminating the effect of this additional safeguard.

Embodiments of the present disclosure advantageously provide a CHMSL system for a vehicle. In many embodiments, the CHMSL system includes a sensor, a primary CHMSL, a wireless secondary CHMSL, a vehicle wireless transceiver, and at least one processor coupled to the sensor, the primary CHMSL, and the vehicle wireless transceiver. The sensor is configured to generate sensor data. The primary CHMSL includes a primary lamp. The wireless secondary CHMSL includes a secondary lamp, a battery, and control circuitry including a CHMSL wireless transceiver and a microcontroller. The processor is configured to facilitate, based on the sensor data, activation of the wireless secondary CHMSL. In certain embodiments, the processor is further configured to facilitate, based on sensor data, deactivation of the primary CHMSL.

The wireless secondary CHMSL offers ease of installation, eliminates the complexity of a wired solution for an auxiliary CHMSL, and integrates with other exterior lighting elements on the vehicle.

Figure 1A:
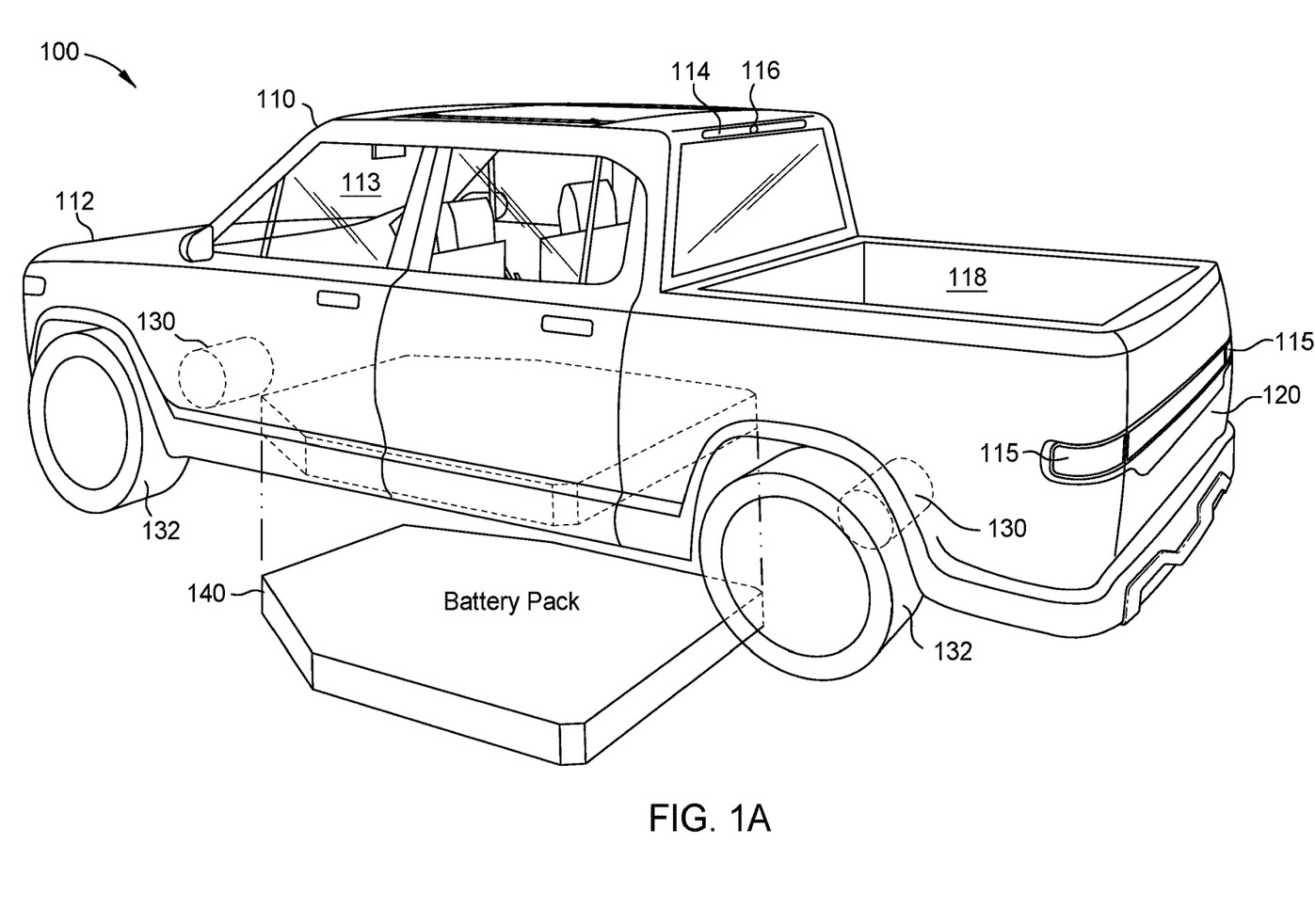
FIG. 1A depicts a diagram of an example vehicle, in accordance with embodiments of the present disclosure.

FIG. 1A depicts a diagram of vehicle 100, in accordance with embodiments of the present disclosure.

Vehicle 100 includes, inter alia, a body, a propulsion system, an auxiliary or accessory system, etc. In many embodiments, body 110 includes, inter alia, a frame or chassis, front end 112, driver/passenger compartment or cabin 113, primary CHMSL 114, tail lights 115, rear-facing camera 116, bed 118, rear end 120, etc. Generally, vehicle 100 is any vehicle that includes a bed, such as a pickup truck, a flatbed truck, a dump truck, etc.

The propulsion system may be a conventional propulsion system that includes an internal combustion engine and drivetrain, an electric propulsion system that includes electric motor(s) and an energy storage subsystem (such as batteries), or a hybrid propulsion system that combines an internal combustion engine and drivetrain with an electric propulsion system. Internal combustion engines may be powered by gasoline fuel, diesel fuel, natural gas, methanol, ethanol, biodiesel, etc. In many hybrid propulsion systems, the internal combustion engine and the electric propulsion system provide motive power to the wheels at the same time or at different times. In certain hybrid propulsion systems, the internal combustion engine may be coupled to an electrical generator rather than a drivetrain, and the electric motors of the electric propulsion system always provide motive power to the wheels.

In many embodiments, vehicle 100 has an electric propulsion system that includes, inter alia, one or more electronic control units (ECUs), one, two or four (or more) electric motors 130 with associated drivetrains, wheels 132, an energy storage subsystem, a suspension subsystem, a steering subsystem, etc. The energy storage subsystem may include, inter alia, one or more ECUs, battery pack 140, a vehicle charging subsystem including a charging port, etc. In other embodiments, vehicle 100 includes a conventional propulsion system or a hybrid propulsion system.

The auxiliary or accessory system includes, inter alia, one or more ECUs, an electrical power distribution system, a heating and air conditioning system, cabin displays, interior and exterior lighting systems, integrated electrical devices, etc.

Figure 1B:
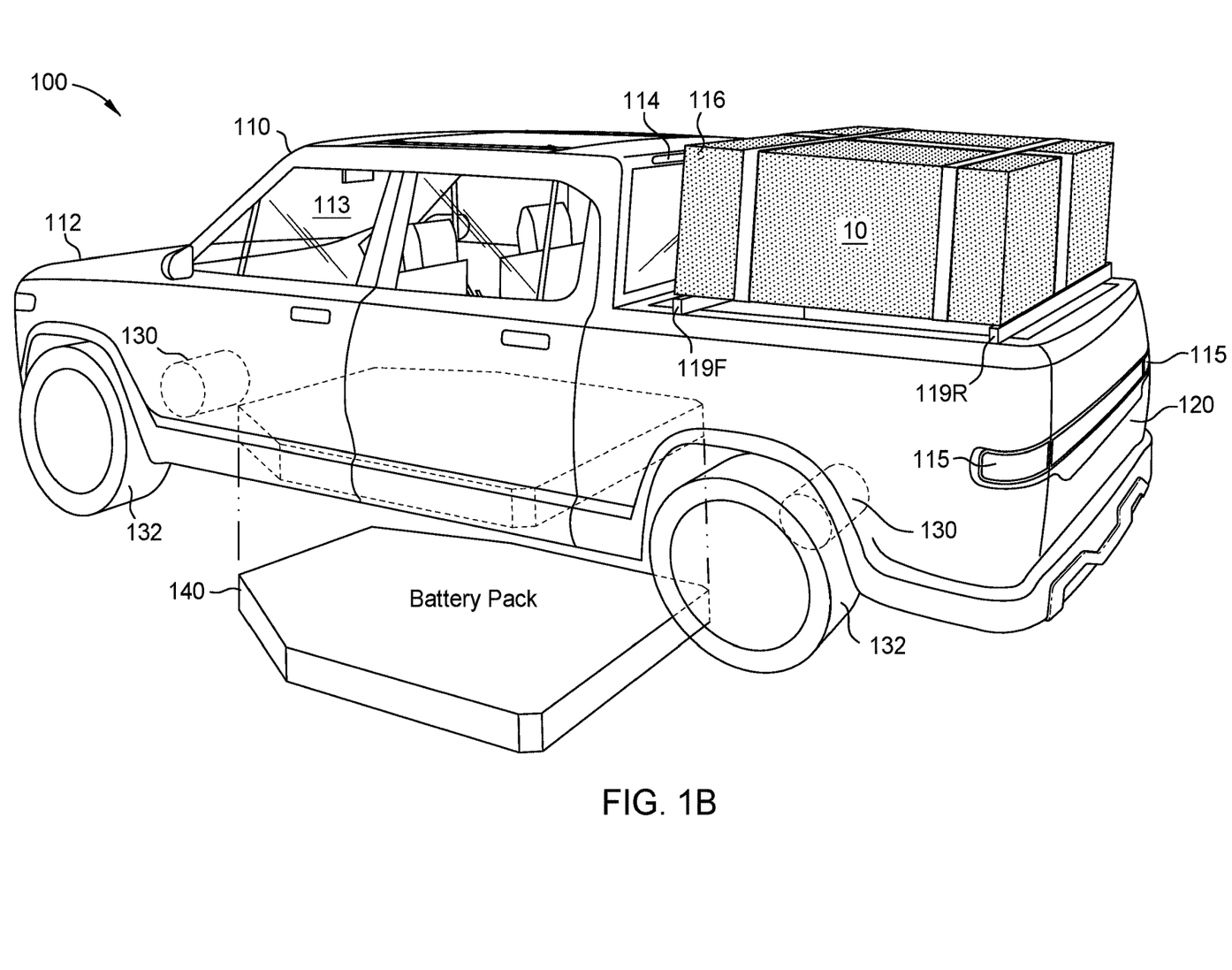
FIG. 1B depicts a diagram of the example vehicle with cargo, in accordance with embodiments of the present disclosure.

FIG. 1B depicts a diagram of vehicle 100 with tall cargo 10, in accordance with embodiments of the present disclosure.

In many embodiments, tall cargo 10 is secured to removable bed rail 119F (front) and removable bed rail 119R (rear) during transportation. Generally, at least two removable bed rails 119 are needed to support tall cargo 10 above bed 118. As shown in FIG. 1B, tall cargo 10 blocks primary CHMSL 114 from view by vehicles, motorcycles, semi-trailer trucks, etc. that are following vehicle 100. Blocking the view of primary CHMSL 114 may present safety-related issues for these drivers, riders and operators. In some other embodiments, removable bed rails 119 are not provided, and tall cargo 10 may be loaded directly into bed 118 and secured therein using ropes, straps, etc., if desired.

When tall cargo 10 is secured to removable bed rails 119 or simply loaded into bed 118, tall cargo 10 may partially or completely obscure the field of view of rear-facing camera 116. In many embodiments, image data from rear-facing camera 116 may be used to determine whether primary CHMSL 114 is blocked by tall cargo 10, as discussed with respect to FIGS. 5 and 6. In some other embodiments, sensor data from one or more other sensors, such as other cameras, proximity sensors located in, or near, bed 118, etc., may be used to determine whether primary CHMSL 114 is blocked by tall cargo 10. Proximity sensor data may be used by itself or in cooperation with camera image data may be used to determine whether primary CHMSL 114 is blocked by tall cargo 10, as discussed with respect to FIGS. 5 and 6.

Figure 1C:
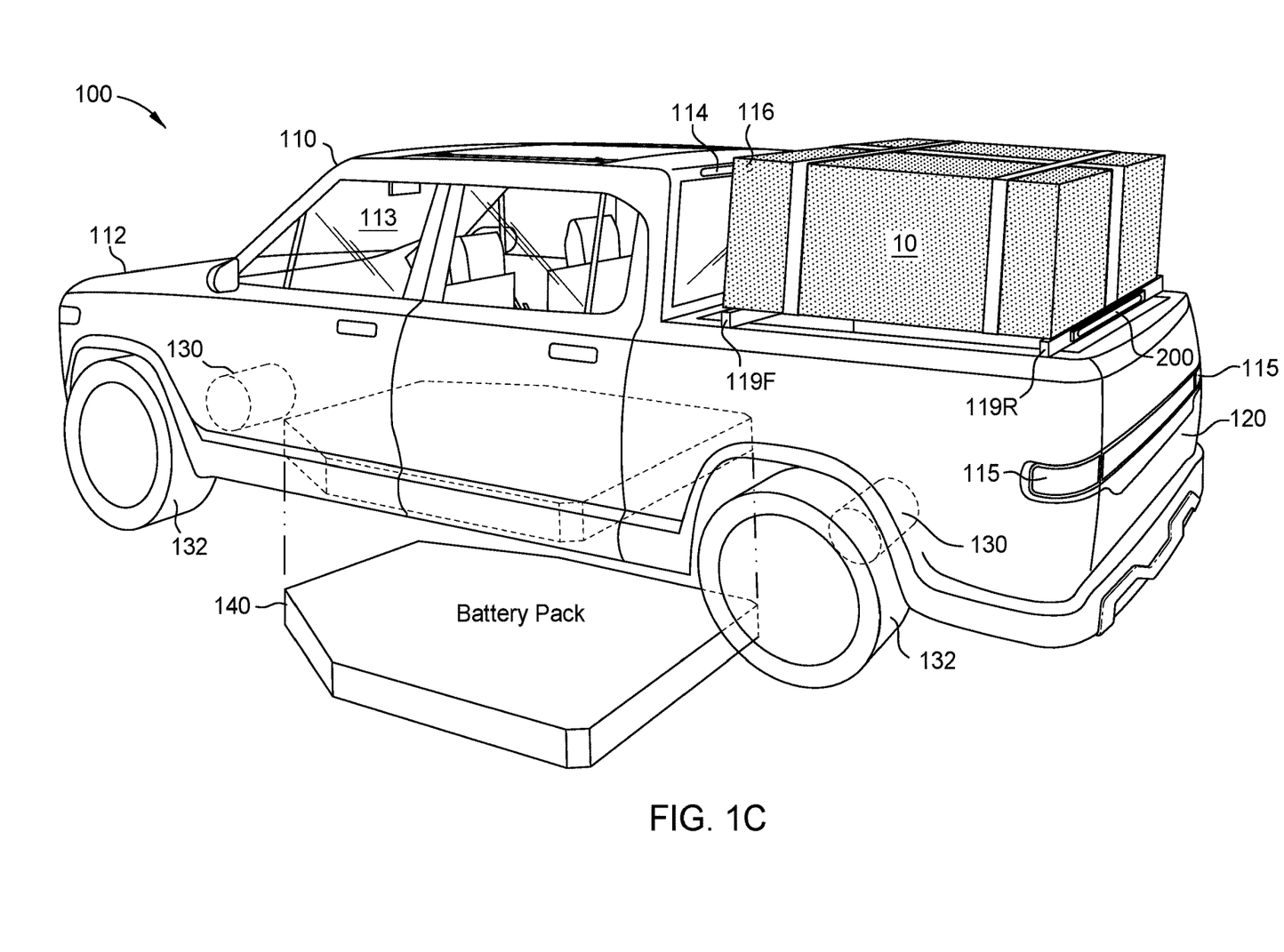
FIG. 1C depicts a diagram of the example vehicle with cargo and a wireless secondary CHMSL, in accordance with embodiments of the present disclosure.

FIG. 1C depicts a diagram of vehicle 100 with tall cargo 10 and wireless secondary CHMSL 200, in accordance with embodiments of the present disclosure.

In many embodiments, wireless secondary CHMSL 200 may be temporarily or removably attached or mounted to removable bed rail 119R, as discussed with respect to FIGS. 3E and 3F. In some other embodiments, wireless secondary CHMSL 200 may be incorporated within removable bed rail 119R as an integral component. In certain embodiments, wireless secondary CHMSL 200 may include lateral extensions that attach to the bed rail mounting locations, which eliminate the need to use removable bed rail 119R for support when tall cargo is loaded directly into bed 118.

As shown in FIG. 1C, while tall cargo 10 blocks primary CHMSL 114 from view, tall cargo 10 does not block wireless secondary CHMSL 200 from view by vehicles, motorcycles, semi-trailer trucks, etc. that are following vehicle 100.

Figure 2A:
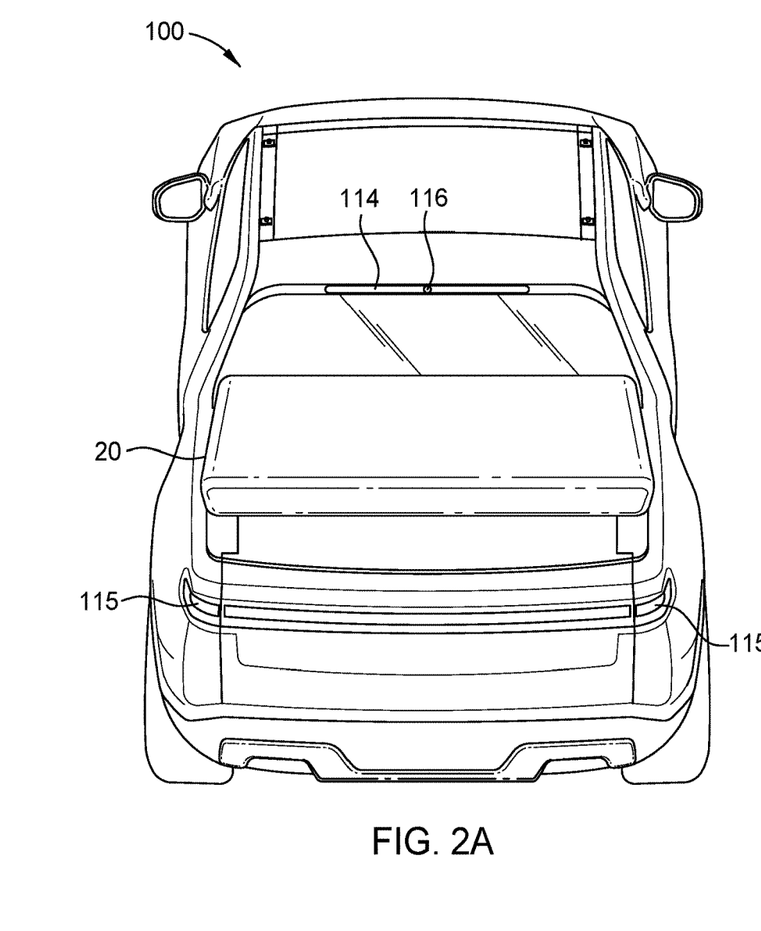
FIG. 2A depicts a diagram of the example vehicle with short cargo, in accordance with embodiments of the present disclosure.

FIG. 2A depicts a diagram of vehicle 100 with short cargo 20, in accordance with embodiments of the present disclosure.

As shown in FIG. 2A, short cargo 20 does not block primary CHMSL 114 from view by vehicles, motorcycles, semi-trailer trucks, etc. that are following vehicle 100.

Figure 2B:
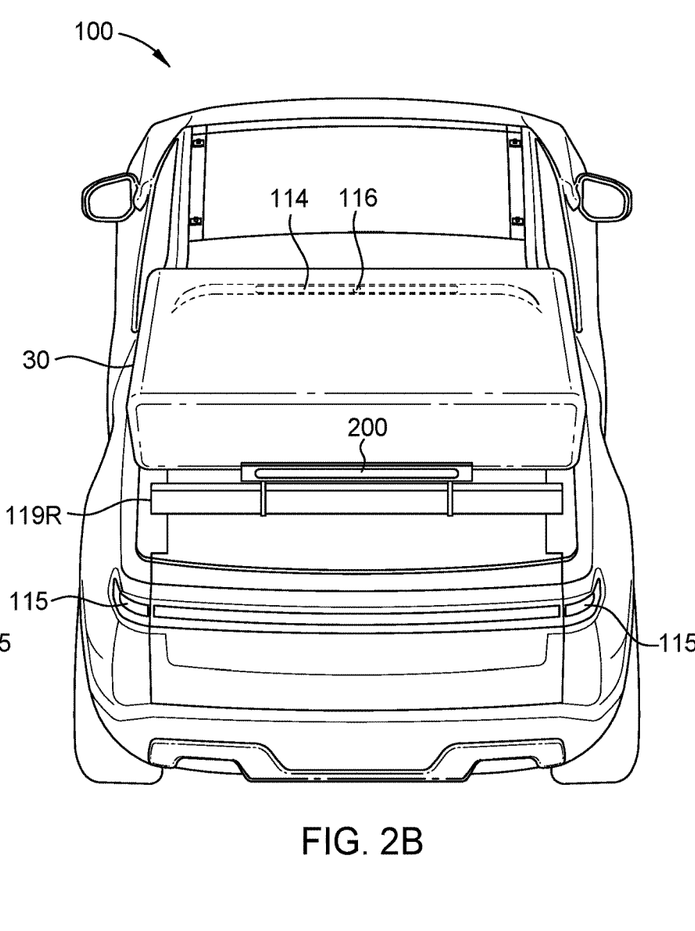
FIG. 2B depicts a diagram of the example vehicle with tall cargo and a wireless secondary CHMSL, in accordance with embodiments of the present disclosure.

FIG. 2B depicts a diagram of vehicle 100 with tall cargo 30 and wireless secondary CHMSL 200, in accordance with embodiments of the present disclosure.

Tall cargo 30 is loaded directly into bed 118, and removable bed rail 119R is provided as a convenient mounting location for wireless secondary CHMSL 200. As shown in FIG. 2B, while tall cargo 30 blocks primary CHMSL 114 from view, tall cargo 30 does not block wireless secondary CHMSL 200 from view by vehicles, motorcycles, semi-trailer trucks, etc. that are following vehicle 100.

Figure 3:
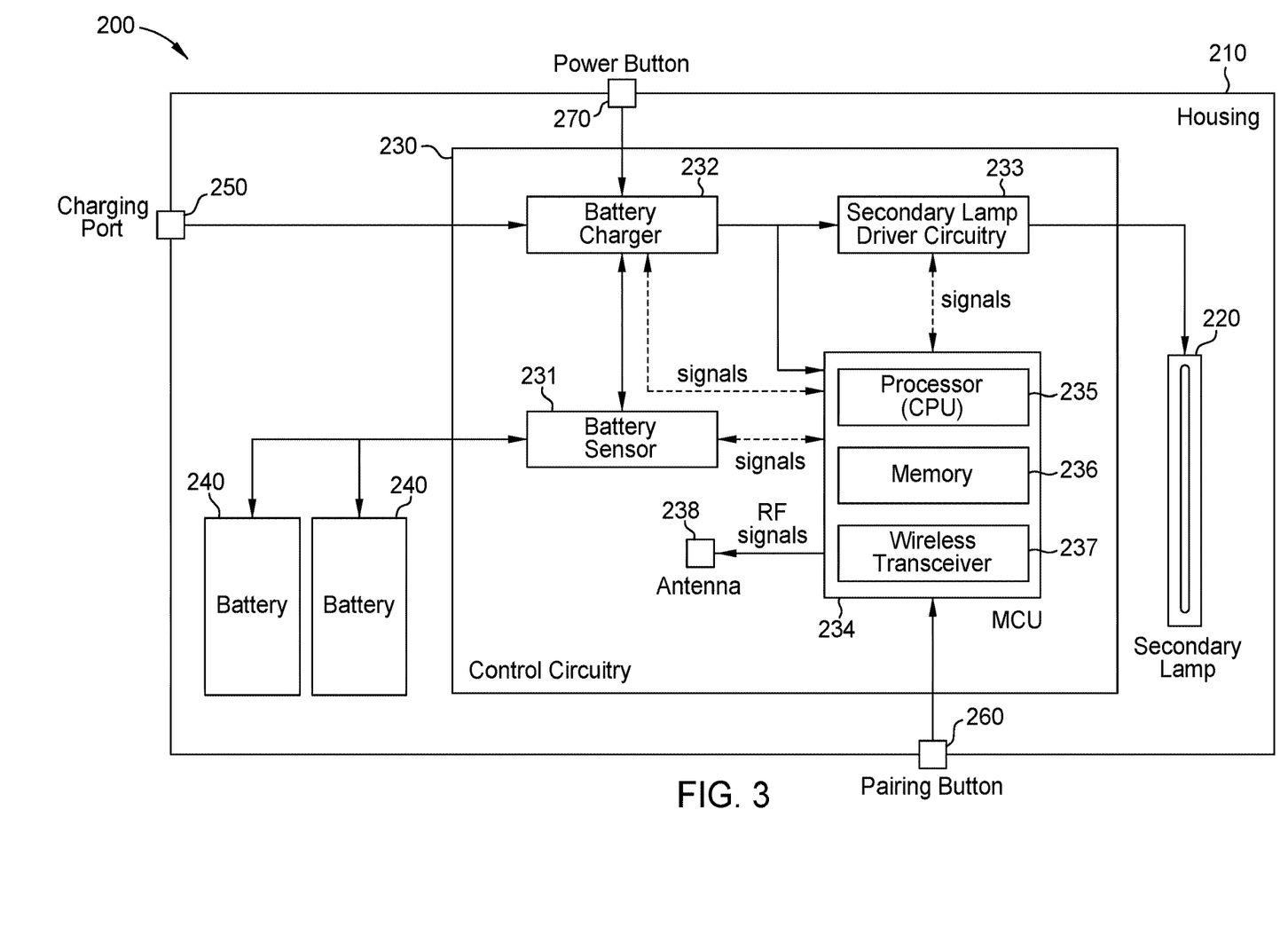
FIG. 3 presents a block diagram of example components of the wireless secondary CHMSL, in accordance with embodiments of the present disclosure.

FIG. 3 presents block diagram of example components of wireless secondary CHMSL 200, in accordance with embodiments of the present disclosure.

In many embodiments, wireless secondary CHMSL 200 includes, inter alia, housing 210, secondary lamp 220, control circuitry 230, one or more rechargeable batteries 240, and charging port 250. Control circuitry 230 includes, inter alia, battery sensor 231, battery charger 232, secondary lamp driver circuitry 233, microcontroller unit (MCU) 234, and antenna 238.

Charging port 250 is coupled to battery charger 232, and receives a cable (such as a USB-C cable) for connection to a 5V power supply, such as a 110 VAC to 5V DC power supply or brick. In many embodiments, MCU 234 may be coupled to certain connector pins within charging port 250 (such as USB UART TX and RX pins), and a USB-C cable may couple charging port 250 to a computer system that communicates with MCU 234 for various purposes.

Battery sensor 231 is coupled to battery charger 232, MCU 234, and rechargeable battery 240. Battery sensor 231 is configured to sense the charge level of rechargeable battery 240, and to generate and transmit one or more battery charge signals to MCU 234. Battery sensor 231 may also be configured to receive certain signals from MCU 234.

Battery charger 232 is coupled to battery sensor 231, secondary lamp driver circuitry 233, MCU 234, charging port 250, and power button 270. During normal operation, battery charger 232 is configured to provide power from rechargeable battery 240 (through battery sensor 231) to secondary lamp driver circuitry 233 and MCU 234. In other words, during normal operation, rechargeable battery 240 is coupled to control circuitry 230 and is configured to power secondary lamp 220 and control circuitry 230.

During battery charging, a cable connects a 5V power supply to charging port 250, and battery charger 232 is configured to provide a charge voltage and a charge current to rechargeable battery 240 through battery sensor 231. Battery charger 232 is also configured to generate and transmit one or more status signals to MCU 234, and to receive a battery charge enable signal from MCU 234. Battery charger 232 provides power (or does not provide power) to secondary lamp driver circuitry 233 and MCU 234 based on the state of power button 270.

In many embodiments, two rechargeable batteries 240 are connected in parallel, such as two LiFePO4 18650 rechargeable cells, each producing a nominal voltage of 3.2V and having a capacity of 2000 mAh (6.4 Wh). In many embodiments, rechargeable batteries 240 are not accessible by the driver. In certain embodiments, rechargeable batteries 240 may be accessed (and replaced) through a waterproof battery compartment cover in housing 210.

Secondary lamp driver circuitry 233 is coupled to battery charger 232 and secondary lamp 220. Secondary lamp driver circuitry 233 is configured to supply power to secondary lamp 220, to generate and transmit a lamp power status signal to MCU 234, and to receive a lamp enable signal from MCU 234. In many embodiments, secondary lamp 220 is a light emitting diode (LED) strip with multiple LEDs, and secondary lamp driver circuitry 233 is an LED driver circuit that increases or boosts the voltage provided by battery charger 232. The LED strip may include red LEDs, or may include white LEDs with a red lens or red translucent covering. Other lamp technology may also be used.

MCU 234 generally includes, inter alia, a microcontroller with processor 235 (such as a central processing unit or CPU, etc.) and memory 236 (such as flash, ROM, RAM, SRAM, etc.), and wireless transceiver 237 connected to antenna 238. In many embodiments, processor 235 may be an Arm Cortex CPU or the like.

Generally, wireless transceiver 237 is configured to transmit messages to vehicle 100 over a wireless communication link, and receive messages from vehicle 100 over the wireless communication link. In certain embodiments, wireless transceiver 237 is a Bluetooth 2.4 GHz RF transceiver, MCU 234 is connected to Bluetooth pairing button 260, and the wireless communication link is a Bluetooth Low Energy (BLE) link. In some other embodiments, wireless transceiver 237 is configured to support one or more IEEE 802.11 wireless communication standards (such as 802.11 A, B, G, N, and AC), and the wireless communication link is a WiFi link.

Generally, MCU 234 is configured to turn on secondary lamp 220 in response to receiving an activation message transmitted over the wireless communication link from a wireless transceiver connected to the control system of vehicle 100, and turn off secondary lamp 220 in response to receiving a deactivation message transmitted over the wireless communication link from the wireless transceiver connected to the control system of vehicle 100.

MCU 234 may also be configured to generate the battery charge enable signal based on the battery charge signals from battery sensor 231 and the status signals from battery charger 232, and transmit the battery charge enable signal to battery charger 232. In response to receiving the battery charge enable signal from MCU 234, battery charger 232 may be configured to charge rechargeable battery 240.

MCU 234 may also be configured to determine a battery charge level based on the battery charge signal, and to generate a status message including the battery charge level for transmission to vehicle 100 via wireless transceiver 237.

MCU 234 may also be configured to determine a fault status for rechargeable battery 240 based on the battery charge signals from battery sensor 231, a fault status for secondary lamp 220 based on the lamp power status signal from secondary lamp driver circuitry 233, a fault status for processor 235, and a fault status for wireless transceiver 237, and to generate a status message including the fault status for transmission to vehicle 100 via wireless transceiver 237.

In certain embodiments, MCU 234 is a Bluetooth Low Energy (BLE) Wireless MCU.

FIGS. 4A to 4D depict several views of wireless secondary CHMSL 200, in accordance with embodiments of the present disclosure.

Figure 4A:
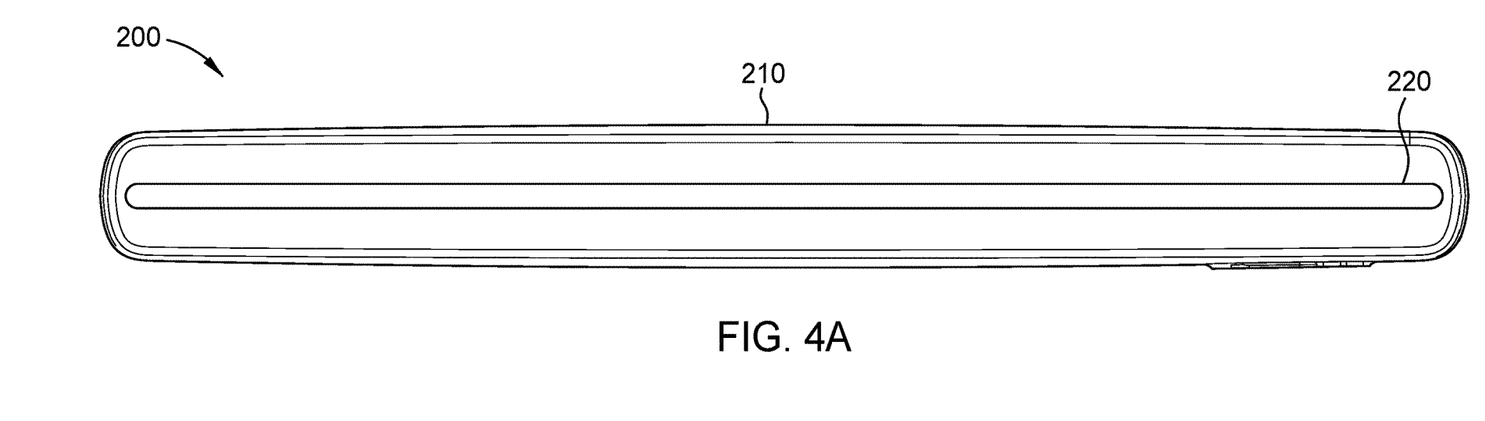
FIGS. 4A to 4D depict several views of an example wireless secondary CHMSL, in accordance with embodiments of the present disclosure.

FIG. 4A depicts a front view of wireless secondary CHMSL 200, in accordance with embodiments of the present disclosure. More particularly, FIG. 4A depicts housing 210 and secondary lamp 220.

Figure 4B:
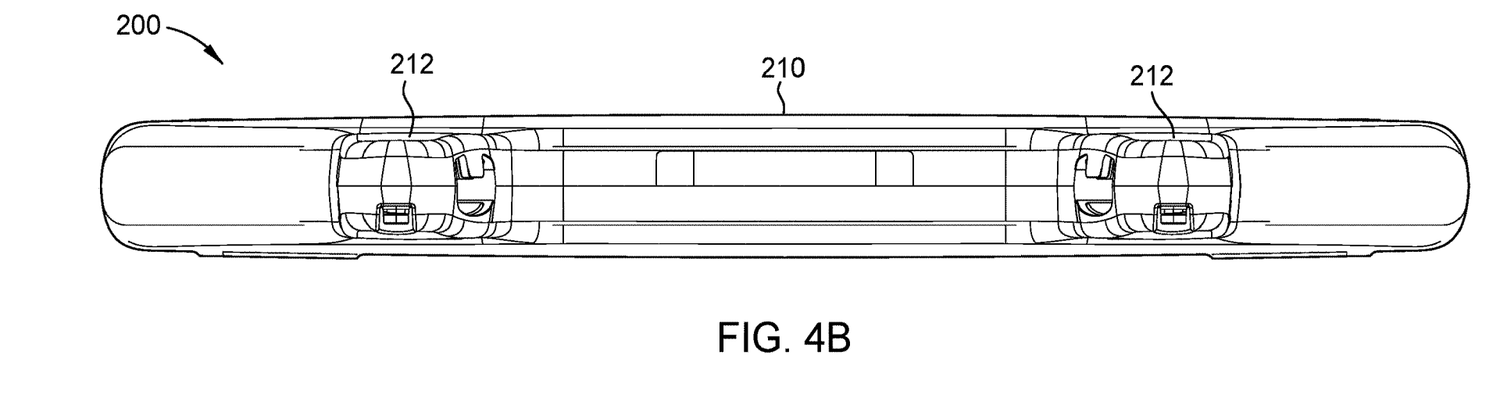

FIG. 4B depicts a rear view of wireless secondary CHMSL 200, in accordance with embodiments of the present disclosure. More particularly, FIG. 4B depicts housing 210 and mounting arms 212. Mounting arms 212 interface with a portion of removable bed rail 119R to attach wireless secondary CHMSL 200 to removable bed rail 119R.

Figure 4C:
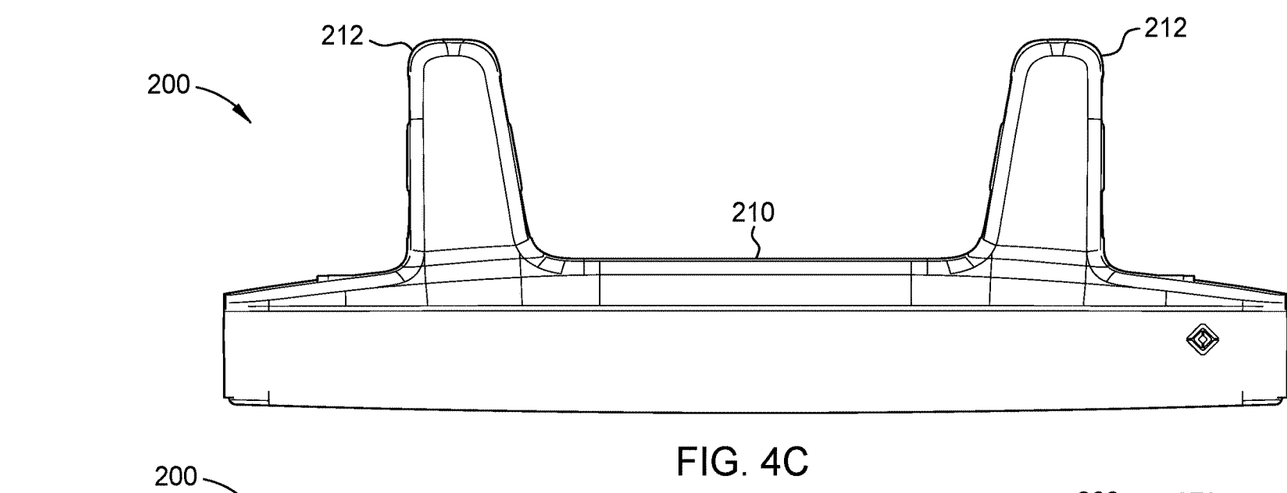

FIG. 4C depicts a top view of wireless secondary CHMSL 200, in accordance with embodiments of the present disclosure. More particularly, FIG. 4C depicts housing 210 and mounting arms 212.

Figure 4D:
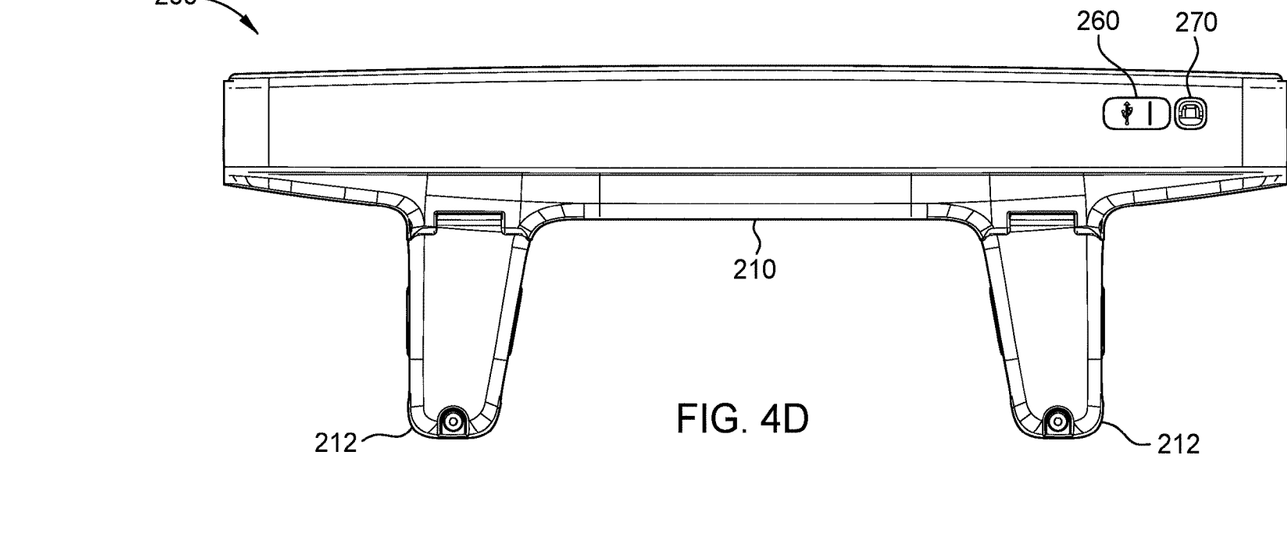

FIG. 4D depicts a bottom view of wireless secondary CHMSL 200, in accordance with embodiments of the present disclosure. More particularly, FIG. 4D depicts housing 210, mounting arms 212, Bluetooth pairing button 260 and power button 270.

Figure 4E:
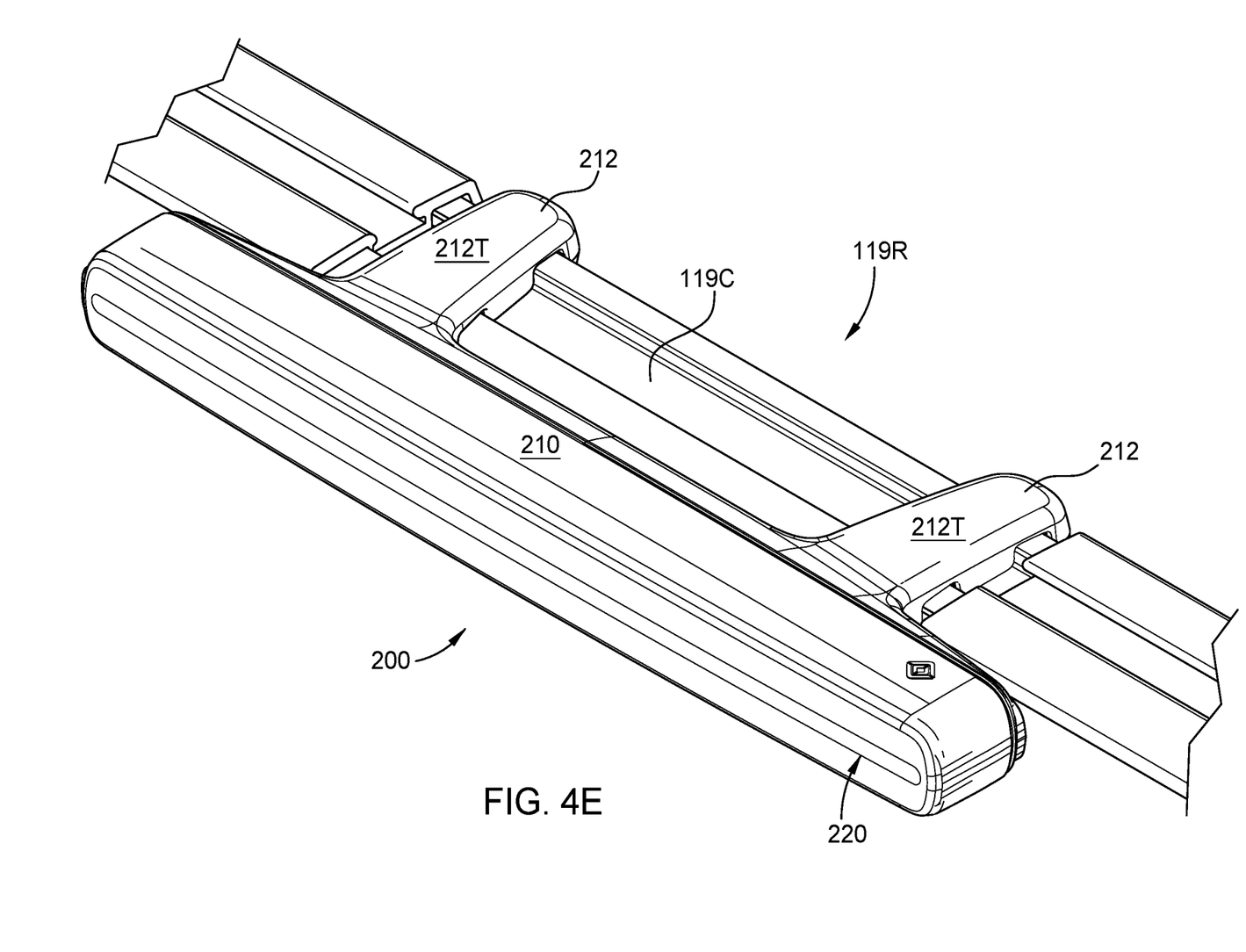
FIGS. 4E and 4F depict perspective views of the example wireless secondary CHMSL mounted to a bed rail, in accordance with embodiments of the present disclosure.
Figure 4F:
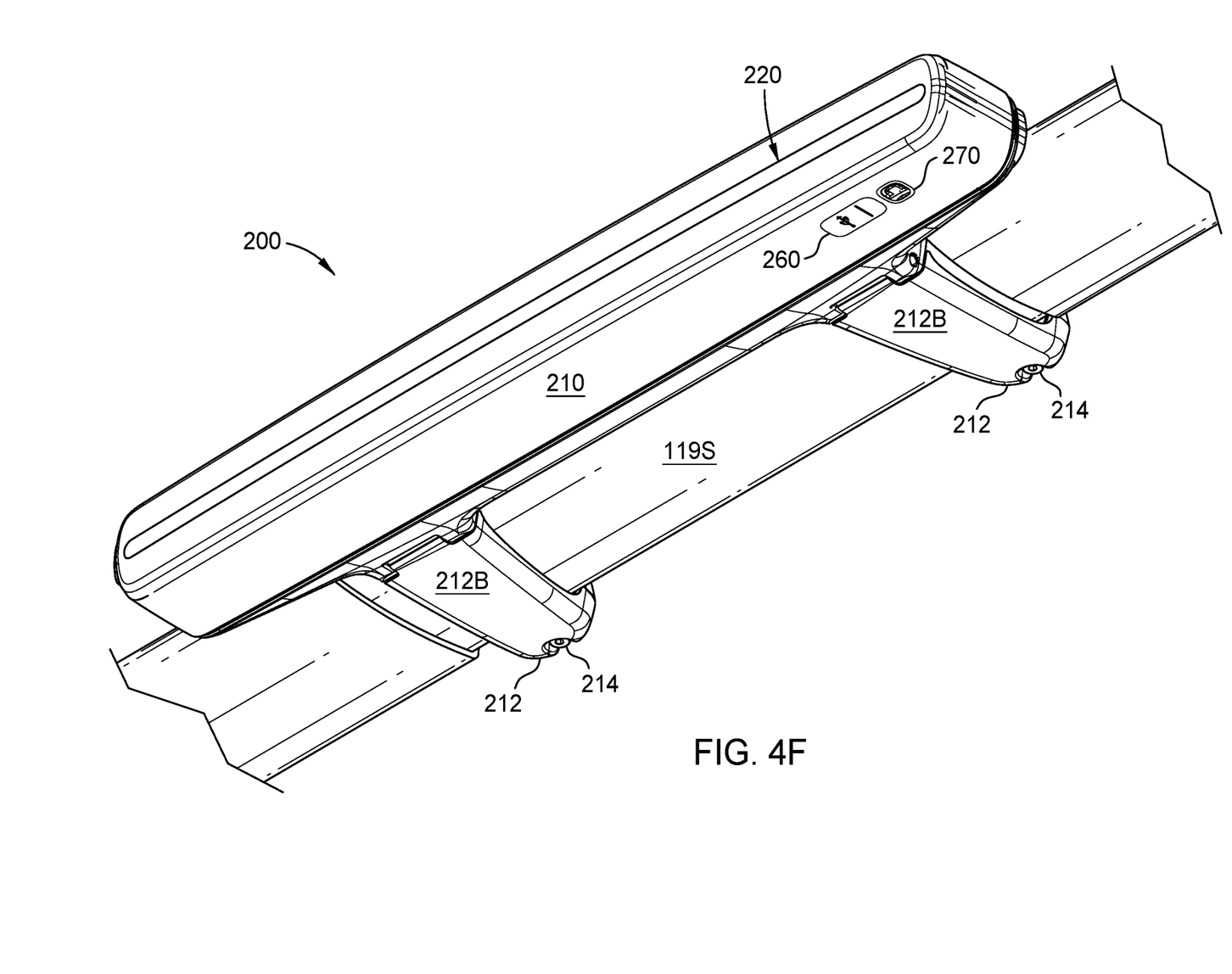

FIGS. 4E and 4F depict top and bottom perspective views, respectively, of wireless secondary CHMSL 200 mounted to removable bed rail 119R, in accordance with embodiments of the present disclosure.

More particularly, FIGS. 4E and 4F depict housing 210, mounting arms 212 and secondary lamp 220, as well as removable bed rail 119R. In many embodiments, each mounting arm 212 includes top mounting arm portion 212T which interfaces with transverse channel 119C within the top potion of removable bed rail 119R, and bottom mounting arm portion 212B which interfaces with smooth surface 119S of the bottom potion of removable bed rail 119R.

Top mounting arm portions 212T are attached to, or form a portion of, housing 210, while bottom mounting arm portions 212B are removably attached to respective top mounting arm portions 212T. Each bottom mounting arm portion 212B is secured to a respective top mounting arm portion 212T using fastener 214, such as a bolt, a screw, etc., which secures wireless secondary CHMSL 200 to removable bed rail 119R.

Figure 5:
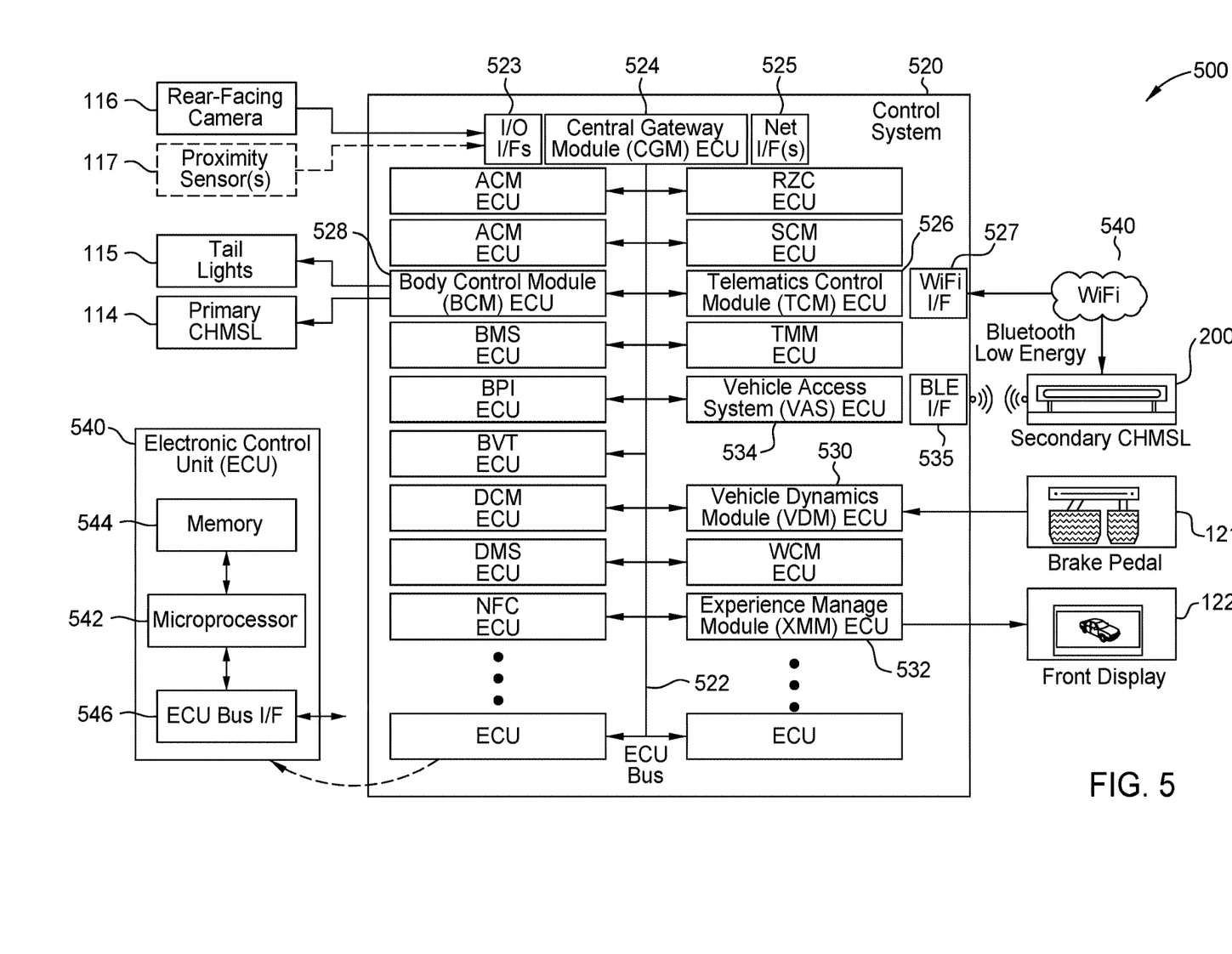
FIG. 5 presents a block diagram of example components of the example vehicle, in accordance with embodiments of the present disclosure.

FIG. 5 presents a block diagram 500 of example components of vehicle 100, in accordance with embodiments of the present disclosure.

Generally, vehicle 100 includes control system 520 that is configured to perform the functions necessary to operate vehicle 100. In many embodiments, control system 520 includes a number of electronic control units (ECUs) 530 coupled to ECU Bus 522 (also known as a controller area network or CAN). Each ECU 540 performs a particular set of functions, and includes, inter alia, microprocessor 542 coupled to memory 544 and ECU Bus I/F 546. In certain embodiments, control system 520 may include one or more system-on-chips (SOCs). Each SOC may include a number of multi-core processors coupled to a high-speed interconnect and on-chip memory, and may perform a much larger set of functions that a single ECU 540.

Control system 520 is coupled to sensors, input/output (I/O) devices, position lights such as tail lights 115 and primary CHMSL 114, and actuators such as brake pedal 121, as well as other components within the propulsion system, the energy storage system, and the accessory system. The sensors may include, for example, cameras such as rear-facing camera 116, proximity sensors 117, other sensors or systems, etc. Proximity sensors 117 may include radar sensors, ultrasonic sensors, optical sensors such as photoelectric sensors, photocells, laser rangefinders, etc. The I/O devices may include, for example, a user interface, front display 122, a rear display, etc. Additionally, control system 520 may be coupled to one or more networks, such as WiFi network 540, etc.

In certain embodiments, one or more ECUs 530 may include the necessary interfaces to be coupled directly to particular sensors, I/O devices, actuators and other vehicle system components. For example, Body Control Module (BCM) ECU 528 may be directly connected to tail lights 115 and primary CHMSL 114 via wired communications links, Vehicle Dynamics Module (VDM) ECU 530 may be directly connected to brake pedal 121 via a wired communications link, Experience Management Module (XMM) ECU 532 may be directly connected to front display 122 via a wired communications link such as HDMI, etc.

Control system 520 may include Central Gateway Module (CGM) ECU 524 which provides a central communications hub for vehicle 100. CGM ECU 524 includes (or is coupled to) I/O interfaces 523 to receive data, send commands, etc., to and from the sensors, I/O devices, actuators and other vehicle system components. CGM ECU 524 also includes (or is coupled to) network interface(s) 525 that provides network connectivity through ECU Bus (or CAN) ports, Local Interconnect Network (LIN) ports, Ethernet ports, etc.

For example, CGM ECU 524 may receive data from rear-facing camera 116, proximity sensors 117, other sensors or systems, etc., as well as the user interface, and then communicate the data over ECU Bus 522 to the appropriate ECU 540. Similarly, CGM ECU 524 may receive commands and data from the ECUs 530 and send them to the appropriate I/O devices, actuators and vehicle components. For example, commands to display GUI widgets may be received from one or more ECUs 530 and sent to XMM EDU 532 for display on front display 122, etc. The GUI widgets may indicate that primary CHMSL 114 is blocked and/or has been deactivated, that the wireless secondary CHMSL 200 has been activated (and turned on) based on a brake engaged signal received by VDM ECU 530, that the wireless secondary CHMSL 200 has been turned off based on a brake disengaged signal received by VDM ECU 530, etc.

Additionally, CGM ECU 524 may also serve as a master control over the different vehicle modes (e.g., road driving mode, parked mode, off-roading mode, tow mode, camping mode), and thereby control certain vehicle components related to placing the vehicle in one of the vehicle modes.

Control system 520 may include Telematics Control Module (TCM) ECU 526 which provides a vehicle communication gateway for vehicle 100. TCM ECU 526 includes (or is coupled to) network interface(s) 527 that provides network connectivity to support functionality such as over-the-air (OTA) software updates, communication between the vehicle and the internet, communication between the vehicle and a computing device, in-vehicle navigation, vehicle-to-vehicle communication, communication between the vehicle and landscape features (e.g., automated toll road sensors, automated toll gates, power dispensers at charging stations), automated calling functionality, etc.

In certain embodiments, wireless transceiver 237 is an IEEE 802.11 (WiFi) transceiver, network interface 527 is an IEEE 802.11 (WiFi) transceiver, and TCM ECU 526 communicates with wireless secondary CHMSL 200 over an IEEE 802.11 (WiFi) wireless communications link. In other words, network interface 527 is a vehicle wireless transceiver that creates a wireless communication link with wireless secondary CHMSL 200.

Control system 520 may include Vehicle Access System (VAS) ECU 534. In many embodiments, wireless transceiver 237 is a Bluetooth transceiver, VAS EDU 534 includes (or is coupled to) Bluetooth interface 535, and VAS EDU 534 communicates with wireless secondary CHMSL 200 over a Bluetooth wireless communications link.

In many embodiments, control system 520 may also include one or more image data processing (IDP) ECUs that process image data received from rear-facing camera 116 (and other cameras), and send the processed image data to front display 122. The IP ECUs may also be configured to execute object detection algorithms to determine whether primary CHMSL 114 is blocked by cargo loaded in bed 118, and to send notifications to VAS ECU 534 and BCM ECU 528. In other embodiments, VAS ECU 534 may be configured to execute object detection algorithms that process image data received from rear-facing camera 116 to determine whether primary CHMSL 114 is blocked by cargo loaded in bed 118, and to send notifications to BCM ECU 528.

In certain embodiments, control system 520 may also include one or more proximity sensor processing (PSP) ECUs that process proximity sensor data received from proximity sensors 117, determine whether primary CHMSL 114 is blocked by cargo loaded in bed 118, and send notifications to VAS ECU 534 and BCM ECU 528. In certain other embodiments, VAS ECU 534 may be configured to process proximity sensor data received from proximity sensors 117, determine whether primary CHMSL 114 is blocked by cargo loaded in bed 118, and then send notifications to BCM ECU 528.

In many embodiments, control system 520 may include, inter alia, Autonomy Control Module (ACM) ECU, Autonomous Safety Module (ASM) ECU, Battery Management System (BMS) ECU, Battery Power Isolation (BPI) ECU, Balancing Voltage Temperature (BVT) ECU, Door Control Module (DCM) ECU, Driver Monitoring System (DMS) ECU, Near-Field Communication (NFC) ECU, Rear Zone Control (RZC) ECU, Seat Control Module (SCM) ECU, Thermal Management Module (TMM) ECU, Winch Control Module (WCM) ECU, etc.

Figure 6:
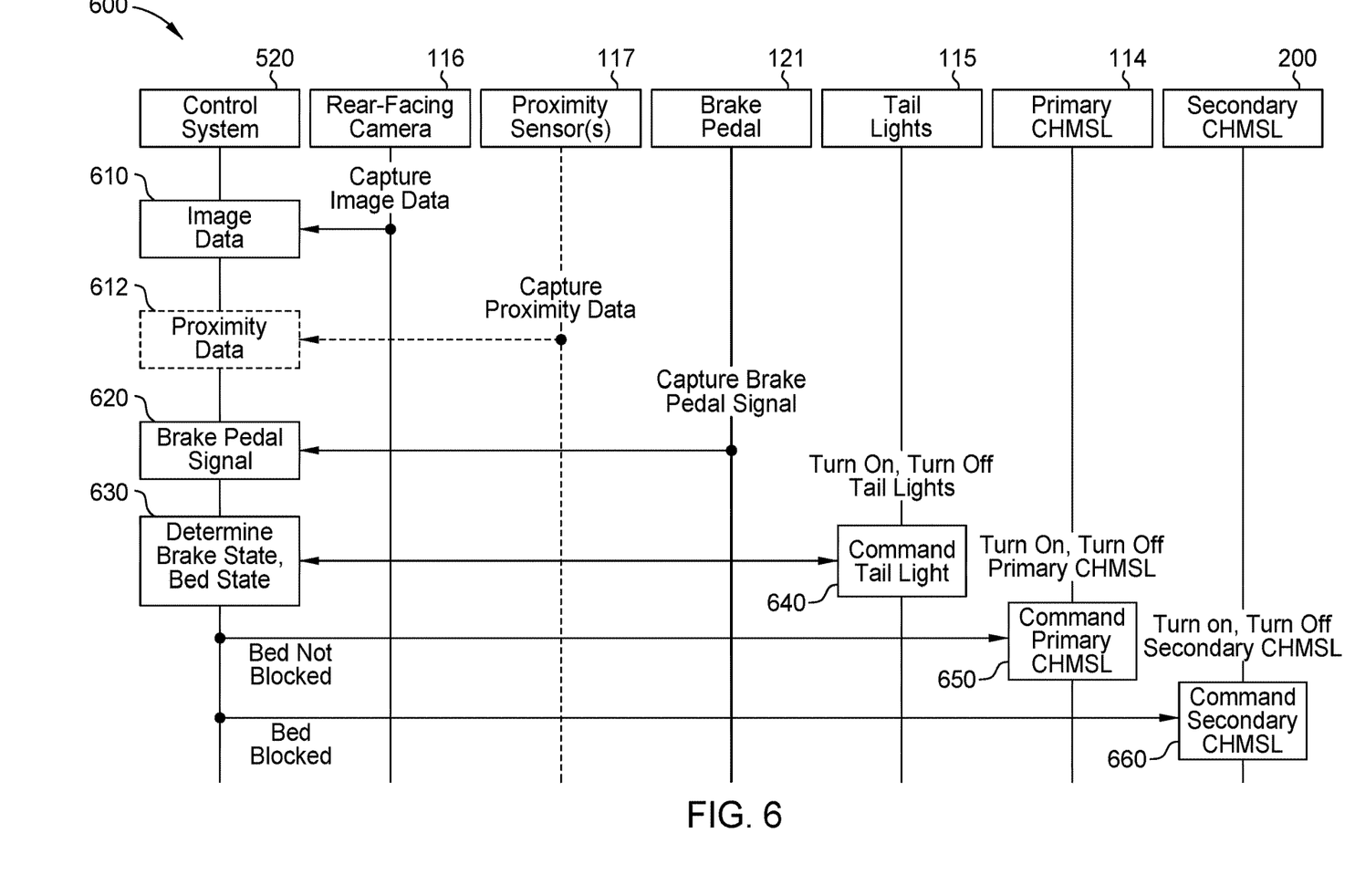
FIG. 6 presents a sequence diagram for a CHMSL system for a vehicle, in accordance with embodiments of the present disclosure.

FIG. 6 presents sequence diagram 600 for a CHMSL system for a vehicle, in accordance with embodiments of the present disclosure.

Generally, sequence diagram 600 depicts control system 520 as well as the components that may be relevant to the CHMSL system of vehicle 100, including primary CHMSL 114, tail lights 115, rear-facing camera 116, proximity sensors 117, brake pedal 121, and wireless secondary CHMSL 200.

In many embodiments, data and signals received by control system 520 include image data 610 and brake pedal signal 620, while operations performed by control system 520 include, inter alia, determining brake pedal state and bed state (operation 630), commanding tail light (operation 640), commanding primary CHMSL (operation 650), and commanding wireless secondary CHMSL (operation 660). The brake pedal state is either engaged or disengaged, and the bed state is either not blocked or blocked.

In many embodiments, at least one processor of control system 520 is configured to facilitate, based on sensor data, activation of the wireless secondary CHMSL. In certain embodiments, at least one processor of control system 520 is configured to facilitate, based on sensor data, deactivation of the primary CHMSL.

In many embodiments, operation 630 may be performed by VDM ECU 530 and VAS ECU 534. More particularly, VDM ECU 530 may be configured to determine the brake pedal state based on brake pedal signal 620 received from brake pedal 121, and VAS ECU 534 may be configured to determine the bed state based on image data 610. In other embodiments, operation 630 may be performed by a single ECU 540.

When the brake pedal state is engaged, VDM ECU 530 sends a notification to BCM ECU 528 to turn on tail lights 115 (i.e., operation 640), and when the brake pedal state is disengaged, VDM ECU 530 sends a notification to BCM ECU 528 to turn off tail lights 115 (i.e., operation 640).

When the bed state is not blocked and the brake pedal state is engaged, VAS ECU 534 sends a notification to BCM ECU 528 to activate (and turn on) primary CHMSL 114 (i.e., operation 650), and when the bed state is not blocked and the brake pedal state is disengaged, VAS ECU 534 sends a notification to BCM ECU 528 to turn off primary CHMSL 114 (i.e., operation 650). In other words, when the bed state is not blocked, primary CHMSL 114 is activated and wireless secondary CHMSL 200 is deactivated.

However, when the bed state is blocked and the brake pedal state is engaged, VAS ECU 534 does not send a notification to BCM ECU 528. Instead, VAS ECU 534 sends a notification to VAS ECU 534 to activate (and turn on) wireless secondary CHMSL 200 (i.e., operation 660). Similarly, when the bed state is blocked and the brake pedal state is disengaged, VAS ECU 534 does not send a notification to BCM ECU 528. Instead, VAS ECU 534 sends a notification to VAS ECU 534 to turn off wireless secondary CHMSL 200 (i.e., operation 660). In other words, when the bed state is blocked, wireless secondary CHMSL 200 is activated and primary CHMSL 114 is deactivated.

In certain other embodiments, data and signals received by control system 520 include proximity sensor data 612 and brake pedal signal 620, and operation 630 may be performed by VDM ECU 530 and VAS ECU 534. More particularly, VDM ECU 530 may be configured to determine the brake pedal state based on brake pedal signal 620 received from brake pedal 121, and VAS ECU 534 may be configured to determine the bed state based on proximity sensor data 612. In other embodiments, operation 630 may be performed by a single ECU 540.

In further embodiments, data and signals received by control system 520 include image data 610, proximity sensor data 612 and brake pedal signal 620, and operation 630 may be performed by VDM ECU 530 and VAS ECU 534. More particularly, VDM ECU 530 may be configured to determine the brake pedal state based on brake pedal signal 620 received from brake pedal 121, and VAS ECU 534 may be configured to determine the bed state based on image data 610 and proximity sensor data 612. In certain other embodiments, operation 630 may be performed by a single ECU 540.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A center high-mounted stop lamp (CHMSL) system for a vehicle, comprising:
   sensors having a view of a cargo area of the vehicle, the sensors including:
      a rear facing camera configured to generate camera image data in response to sensing the presence of a cargo in the cargo area of the vehicle, and
      a proximity sensor configured to generate proximity sensor data in response to sensing the presence of the cargo in the cargo area of the vehicle;
   a primary CHMSL including a primary lamp;
   a wireless secondary CHMSL, including:
      a secondary lamp,
      control circuitry coupled to the secondary lamp, the control circuitry including a CHMSL wireless transceiver and a microcontroller, and
      a battery coupled to the control circuitry, the battery configured to power the secondary lamp and the control circuitry;
   a vehicle wireless transceiver; and
   at least one processor, coupled to the sensor, the primary CHMSL, and the vehicle wireless transceiver, the at least one processor configured to:
      determine, based on the camera image data and the proximity sensor data, whether the view of the primary CHMSL is blocked or not blocked by the cargo present in the cargo area of the vehicle,
      when the view of the primary CHMSL is blocked:
         in response to receiving a brake engaged signal, send an activation message to the wireless secondary CHMSL over a wireless communication link, and
         in response to receiving a brake disengaged signal, send a deactivation message to the wireless secondary CHMSL over the wireless communication link,
      when the view of the primary CHMSL is not blocked:
         in response to receiving the brake engaged signal, send the activation message to the primary CHMSL via a wired communications link, and
         in response to receiving the brake disengaged signal, send the deactivation message to the primary CHMSL via the wired communications link.

2. The CHMSL system of claim 1, wherein the control circuitry is configured to:
   turn on the secondary lamp in response to receiving the activation message; and
   turn off the secondary lamp in response to receiving the deactivation message.

3. The CHMSL system of claim 1, wherein the brake engaged signal and the brake disengaged signal are generated by a brake pedal of the vehicle that is configured to communicate with the at least one processor.

4. The CHMSL system of claim 1, wherein the cargo area includes a bed and a rail, and the wireless secondary CHMSL is mounted to the rail.

5. The CHMSL system of claim 1, wherein the microcontroller and the CHMSL wireless transceiver are packaged in a single module.

6. The CHMSL system of claim 5, wherein:
   the vehicle wireless transceiver is a Bluetooth transceiver;
   the secondary lamp includes one or more light-emitting diodes (LEDs) coupled to LED driver circuitry;
   the CHMSL wireless transceiver is a Bluetooth transceiver; and
   the wireless communication link is a Bluetooth low energy communications link.

7. The CHMSL system of claim 1, wherein:
   the control circuitry includes a battery sensor coupled to the battery, the battery sensor configured to generate a battery charge signal; and
   the control circuitry is configured to:
      determine a battery charge level based on the battery charge signal,
      generate a first status message including the battery charge level, and
      transmit the first status message to the at least one processor over the wireless communication link.

8. The CHMSL system of claim 7, wherein the control circuitry is configured to:
   determine a fault status for at least one of the battery, the secondary lamp, the CHMSL wireless transceiver, and the microcontroller,
   generate a second status message including the fault status, and
   transmit the second status message to the at least one processor over the wireless communication link.

9. The CHMSL system of claim 8, wherein the at least one processor is configured to send the battery charge level and the fault status to a display of the vehicle.

* * * * *